US006553941B2

(12) United States Patent
Porter

(10) Patent No.: US 6,553,941 B2
(45) Date of Patent: Apr. 29, 2003

(54) ANIMAL GROOMING SQUEEGEE APPARATUS

(76) Inventor: Stuart J. Porter, 5400 Reservoir Rd., Georgetown, CA (US) 95634

( * ) Notice: Subject to any disclaimer, the term of this patent is extended or adjusted under 35 U.S.C. 154(b) by 0 days.

(21) Appl. No.: 09/850,787

(22) Filed: May 8, 2001

(65) Prior Publication Data

US 2002/0166511 A1 Nov. 14, 2002

(51) Int. Cl.[7] .................. A01K 13/00

(52) U.S. Cl. .................. 119/665; 119/604; 239/530; 239/532; 401/130; 401/263; 401/285

(58) Field of Search .................. 119/604, 665, 119/608; 4/567, 568, 569, 615; 401/130, 128, 126, 263, 270, 285; 239/530, 532

(56) References Cited

U.S. PATENT DOCUMENTS 752,803 A * 2/1904 Ross .................. 239/553.5
2,529,531 A * 11/1950 Abidlgaard et al. .................. 111/7.1
2,660,251 A * 11/1953 Birosh .................. 119/604
3,023,971 A * 3/1962 Milhous .................. 15/236.04
3,143,984 A * 8/1964 Morasch .................. 111/7.1
4,750,883 A * 6/1988 Drake .................. 134/167 C
4,912,782 A * 4/1990 Robbins .................. 239/520
5,007,753 A * 4/1991 England, Jr. .................. 401/139
5,349,716 A * 9/1994 Millar .................. 15/236.06
5,649,502 A * 7/1997 Frank .................. 119/665
6,085,381 A * 7/2000 Aleshire .................. 15/245

* cited by examiner

*Primary Examiner*—Michael J. Carone
*Assistant Examiner*—John W. Zerr
(74) *Attorney, Agent, or Firm*—Larry D. Johnson; Craig M. Stainbrook; Johnson & Stainbrook, LLP

(57) ABSTRACT

An improved squeegee with integral nozzle and wiping blade for the washing and grooming of animals, especially large animals such as horses and other livestock, includes a body portion, a valve to regulate the flow of water, a nozzle oriented to direct a spray of water generally perpendicularly downwards relative to the body, and an arcuate wiping blade. The arcuate shape of the wiping blade enables it to be oriented relative to the surface being cleaned so that the curvature of the blade conforms to the shape of the surface. The apparatus is connected to a supply of water such as a garden hose, such that when it is drawn across the animal's body, water from the nozzle wets the animal's coat, and the wiping blade then removes water, soap, and dirt.

11 Claims, 7 Drawing Sheets

ANIMAL GROOMING SQUEEGEE APPARATUS

BACKGROUND OF THE INVENTION

1. Field of the Invention

This invention relates generally to animal grooming and animal care products, and more specifically to an improved squeegee apparatus for use in the grooming of animals, and in particular large animals such as horses and other livestock.

2. Description of the Prior Art

The care and grooming of animals, especially large animals such as horses and other livestock, can be a dirty, labor intensive, and time consuming task. For example, even the simple washing of a horse with traditional grooming tools such as a hose and brush can take an hour or longer, and leave the groomer wet and dirty.

SUMMARY OF THE INVENTION

The animal grooming squeegee apparatus of this invention provides an improved squeegee with integral nozzle and wiping blade for the washing and grooming of animals, especially large animals such as horses and other livestock. The inventive apparatus includes a body portion, a valve to regulate the flow of water, a nozzle oriented to direct a spray of water generally perpendicularly downwards relative to the body, and an arcuate wiping blade. The arcuate shape of the wiping blade enables it to be oriented relative to the surface being cleaned so that the curvature of the blade conforms to the shape of the surface. The squeegee apparatus is connected to a supply of water such as a garden hose, such that when the squeegee apparatus is drawn across the animal's body, water from the nozzle wets the animal's coat, and the wiping blade then removes the water, along with any accumulated soap and dirt.

DETAILED DESCRIPTION OF A PREFERRED EMBODIMENT

Figure 1:
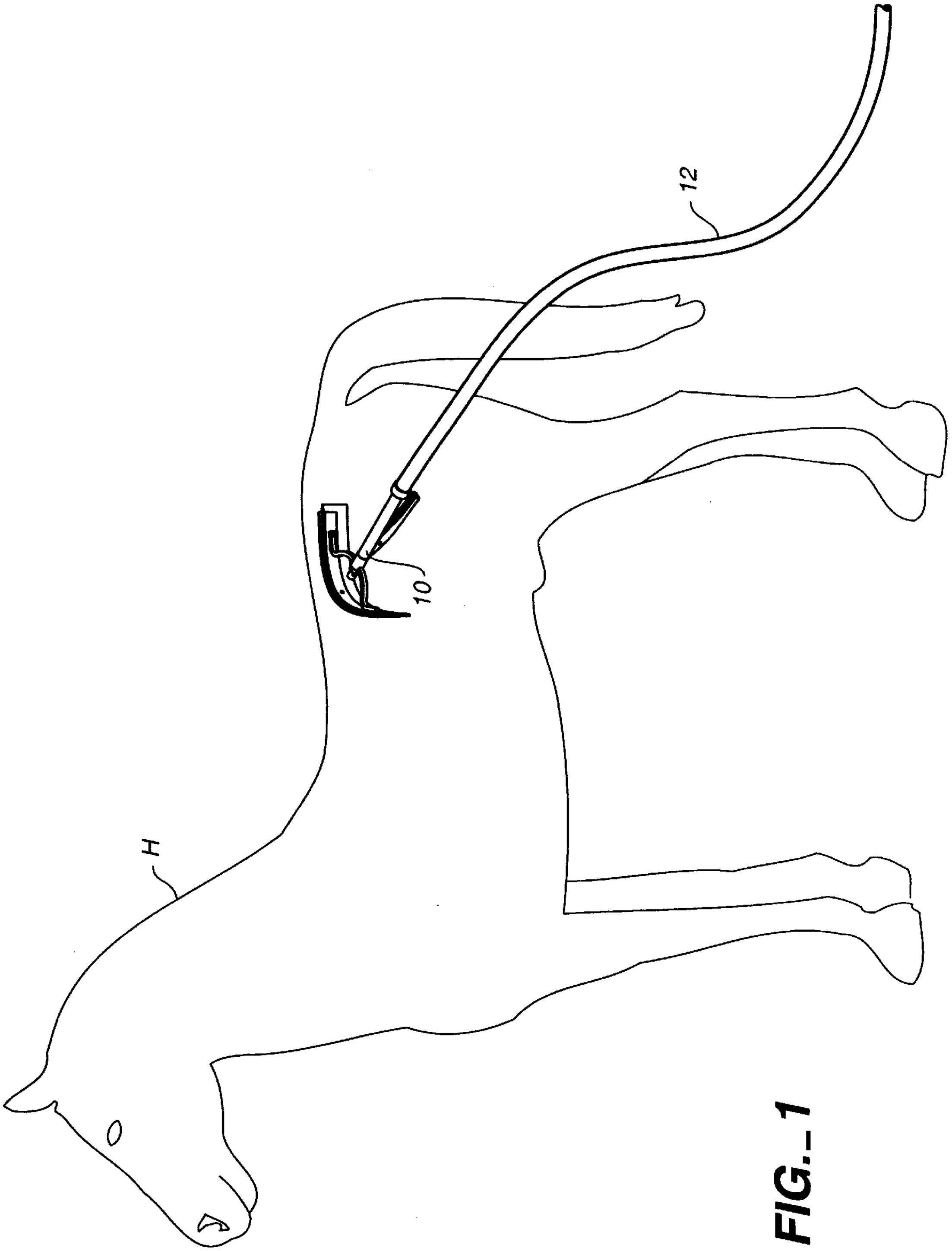
FIG. 1 is a perspective view of a single nozzle embodiment of an animal grooming squeegee apparatus of this invention shown in use for the grooming of a horse.

FIG. 1 is a perspective view of a single nozzle embodiment 10 of an animal grooming squeegee apparatus of this invention shown in use for the grooming of a horse H. The squeegee apparatus is connected to a supply of water such as a garden hose 11, such that when the squeegee apparatus is drawn across the animal's body, it removes water, soap, and dirt.

Figure 2:
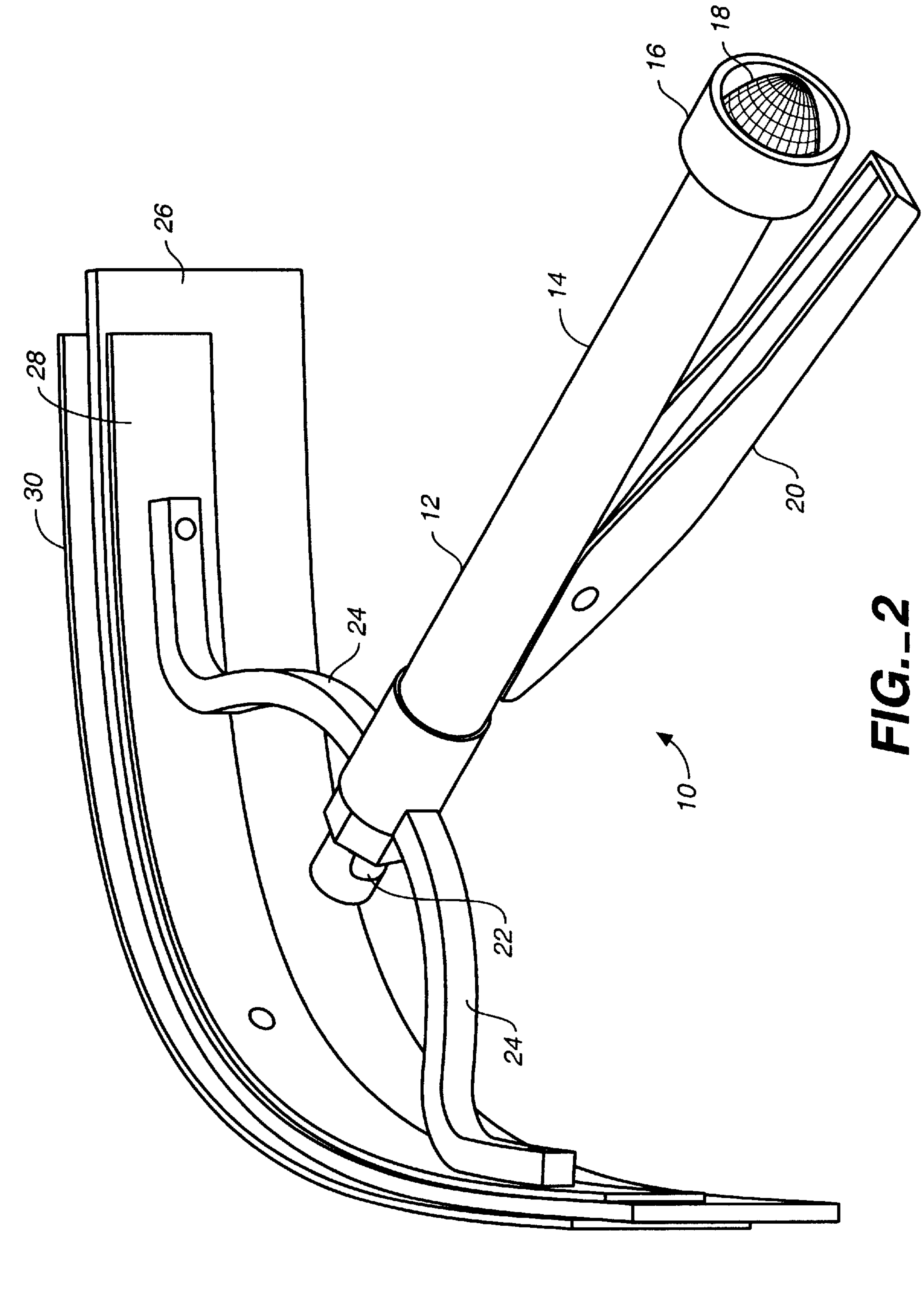
FIG. 2 is a perspective view of the single nozzle embodiment of the squeegee apparatus of FIG. 1 illustrating its component parts.

FIG. 2 is a perspective view of the single nozzle embodiment 10 of the squeegee apparatus of FIG. 1 illustrating its component parts, including a body portion 12, a handle 14, a collar 16 for connection to a supply of water such as a garden hose, a screen 18 to remove debris from the water flow, and a valve or trigger 20 to regulate the flow of water through the body portion, in the manner of well-known garden hose nozzles. The body portion 12 terminates in a nozzle 22, oriented to direct a spray of water away from the body portion, and preferably generally perpendicularly downwards relative to the body portion, as described infra.

A pair of struts or arms 24 extend laterally outward from the body portion near its terminus, and connect a wiping blade 26 and blade supports 28, 30 to the body. Proximal blade support 28 and distal blade support 30 are preferably generally rigid, curved plate members capturing the upper portion of the preferably flexible wiping blade 26 therebetween.

The arcuate shape (e.g., semicircular, parabolic, or hyperbolic curve) of the blade supports, and thus the wiping blade itself, enables the wiping blade to be oriented relative to the surface being cleaned so that the bottom (contact) edge of the blade conforms to the shape of the to surface. For example, when the blade is drawn across a distinctly curved surface (e.g., a relatively small radius convex surface such as an animal's leg or neck), the handle is manipulated so that the wiping blade is inclined to the surface, and therefore more of the length of the blade is kept in contact with the (curved) surface. Alternatively, when the blade is drawn across a straighter surface (e.g., a generally flat or relatively large radius convex surface such as a large animal's side or back) the handle is manipulated so that the wiping blade is more perpendicular to the surface, again so that more of the length of the blade remains in contact with the (straight) surface.

Figure 3:
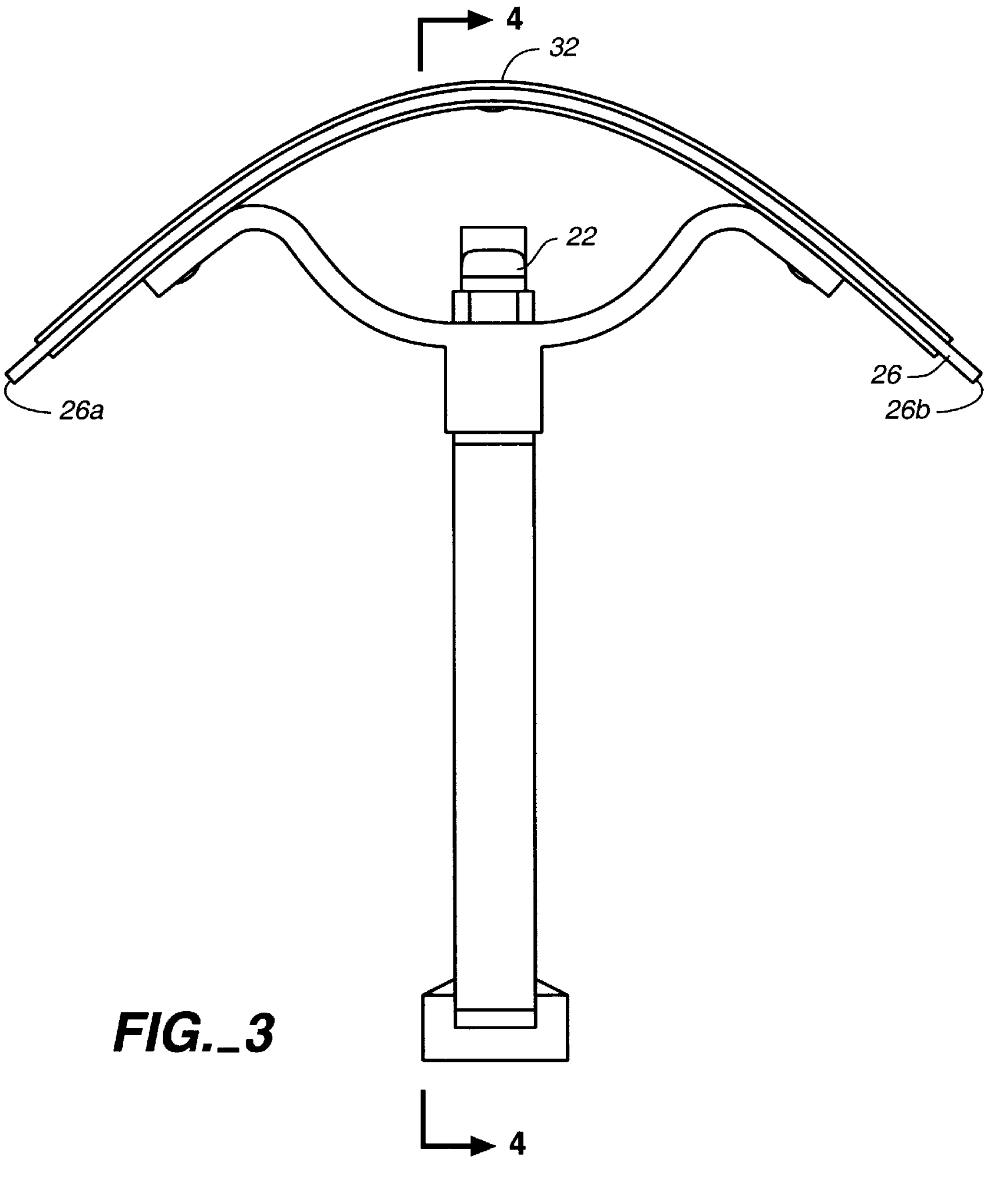
FIG. 3 is a bottom plan view of the single nozzle embodiment of the squeegee apparatus of FIG. 1, this view taken along line 3—3 of FIG. 4.
Figure 4:
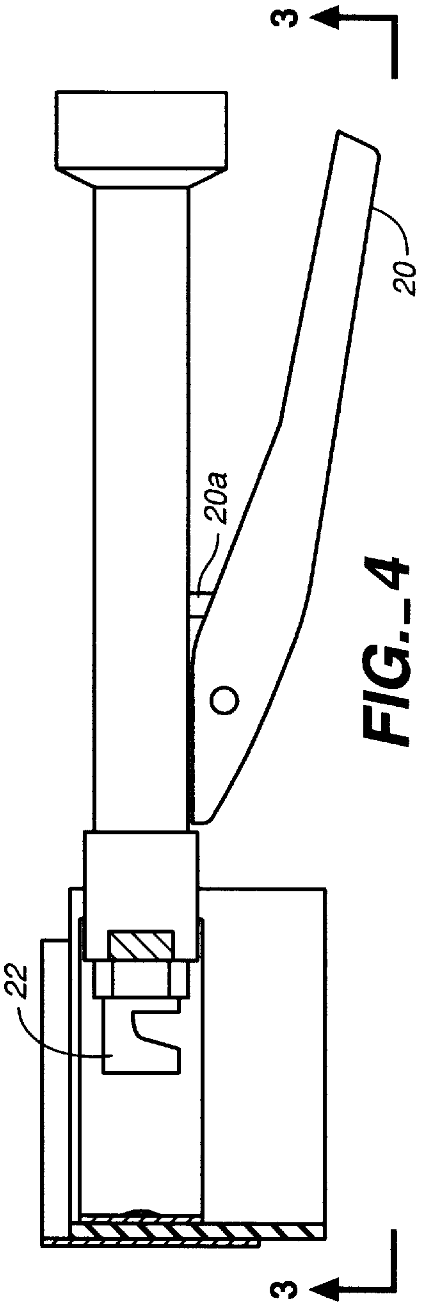
FIG. 4 is a side elevation cross-sectional view of the single nozzle embodiment of the squeegee apparatus of FIG. 1, illustrating the apparatus in its static (no water flow) mode, this view taken along line 4—4 of FIG. 3.

FIG. 3 is a bottom plan view of the single nozzle embodiment 10 of the squeegee apparatus of FIG. 1, this view taken along line 3—3 of FIG. 4. This view illustrates the preferred positioning of the nozzle 22, aft of the apex 32 of the wiping blade 26, and forward of the ends 26*a*, 26*b* of the blade 26. That is, the nozzle is preferably positioned within the open shape defined by the apex and the ends of the blade. This position helps to reduce splashing and water spray on the groomer.

FIG. 4 is a side elevation cross-sectional view of the single nozzle embodiment 10 of the squeegee apparatus of FIG. 1, illustrating the apparatus in its static (no water flow) mode, this view taken along line 4—4 of FIG. 3. In this view, valve actuator 20*a* is in its normal, closed position.

Figure 5:
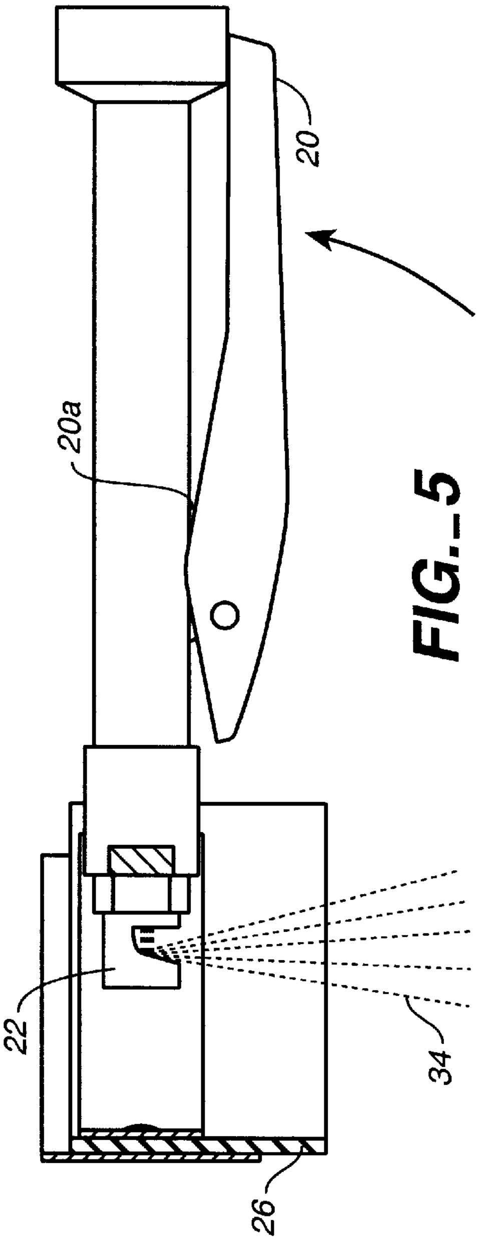
FIG. 5 is a side elevation cross-sectional view of the single nozzle embodiment of the squeegee apparatus of FIG. 1, illustrating the apparatus in its active (washing) mode, with the valve trigger depressed to permit water flow through the nozzle adjacent the squeegee blade and onto the animal.

FIG. 5 is a side elevation cross-sectional view of the single nozzle embodiment 10 of the squeegee apparatus of FIG. 1, illustrating the apparatus in its active (washing) mode, with the valve trigger 20 depressed to open valve actuator 20*a* and permit water flow through the nozzle 22 and onto the animal adjacent the squeegee blade 26. The water spray 34 is thus directed downward from the body 12, and within the curved shape of the blade 26. The water spray could also include soap, additives, and the like, introduced into the water stream by a venturi feeder or other means, as is well known in the art.

Figure 6:
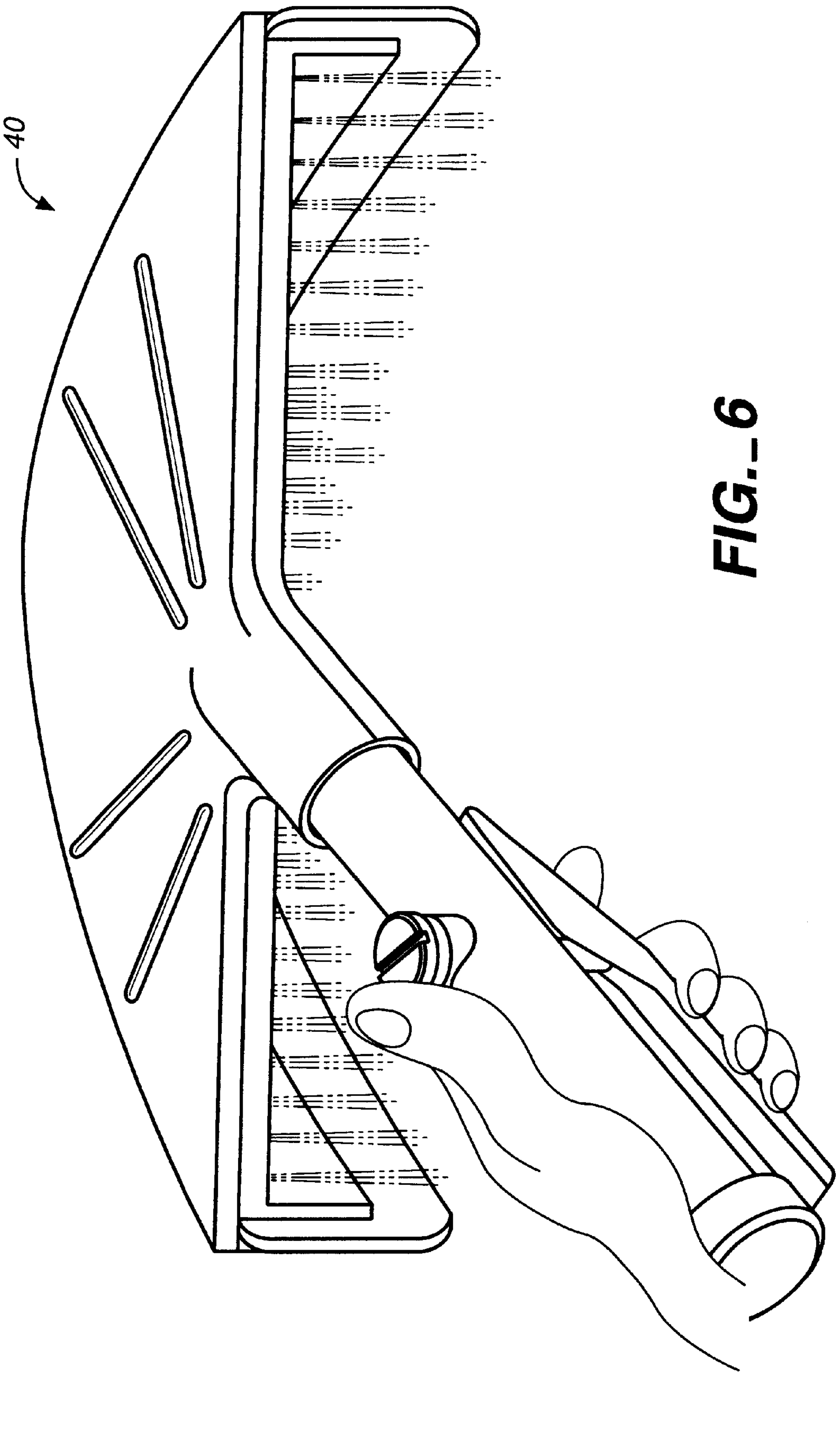
FIG. 6 is a perspective view of a manifold, multiple-nozzle embodiment of an animal grooming squeegee apparatus of this invention.

FIG. 6 is a perspective view of a manifold, multiple-nozzle embodiment 40 of an animal grooming squeegee apparatus of this invention. This embodiment differs from the single nozzle style embodiment of FIGS. 1–5 by providing a plurality of nozzles in an arcuate array adjacent the wiping blade.

Figure 7:
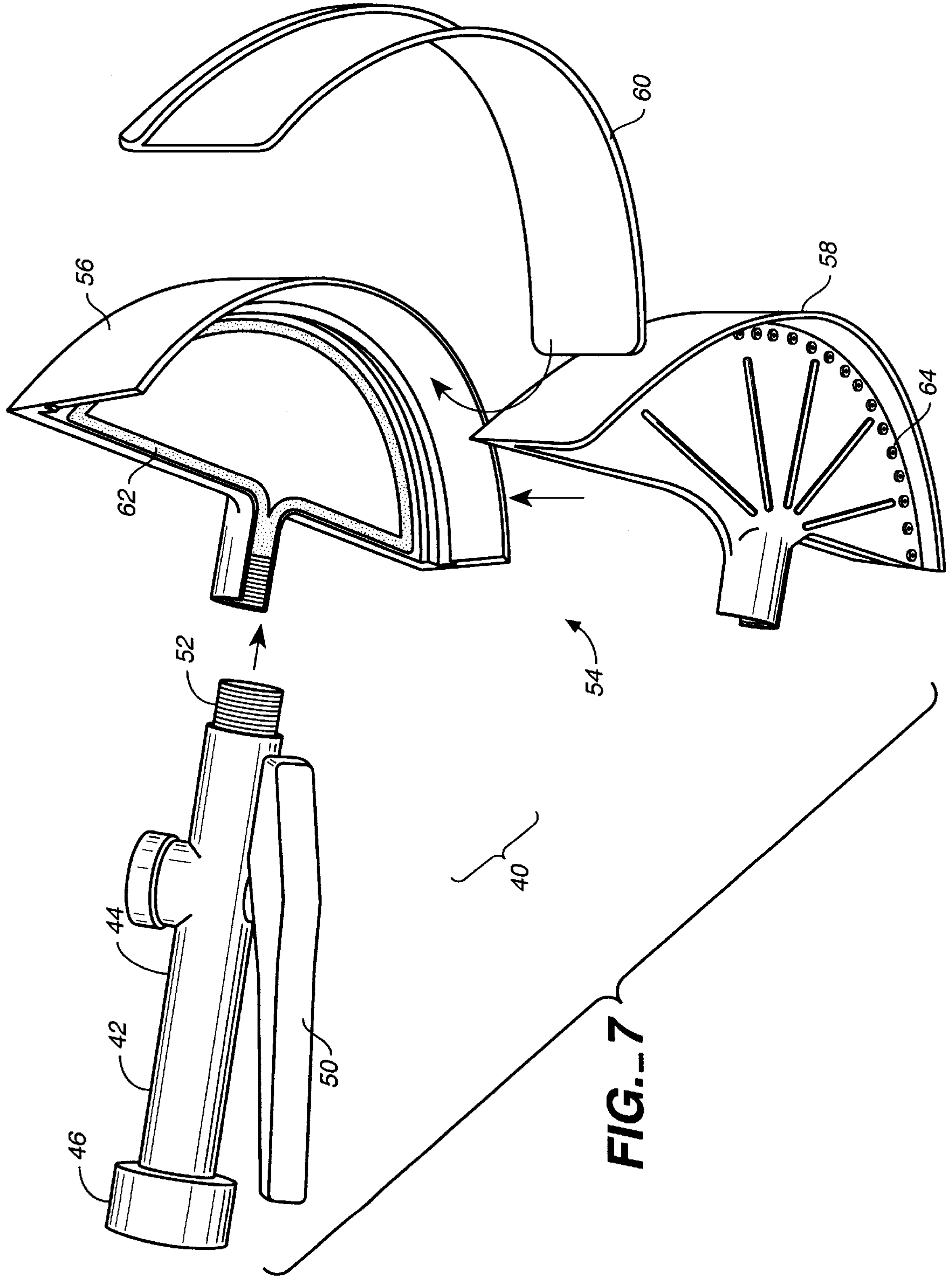
FIG. 7 is an exploded view of the manifold, multiple-nozzle embodiment of the squeegee apparatus of FIG. 6.

FIG. 7 is an exploded view of the manifold, multiple-nozzle embodiment 40 of FIG. 6. Apparatus 40 may include body 42, handle 44, collar 46, and valve trigger 50, all analogous to related parts of the single nozzle embodiment of FIGS. 1–5. However, the body 42 of this manifold embodiment 40 preferably terminates in a threaded end 52, adapted for threaded connection to manifold assembly 54 made up of upper and lower manifold halves 56, 58, which capture flexible squeegee blade 60 therebetween. Water passing through body 42 is directed through channel 62 in the manifold, and then is discharged through the plurality of nozzles 64 in lower manifold half 58.

Figure 8:
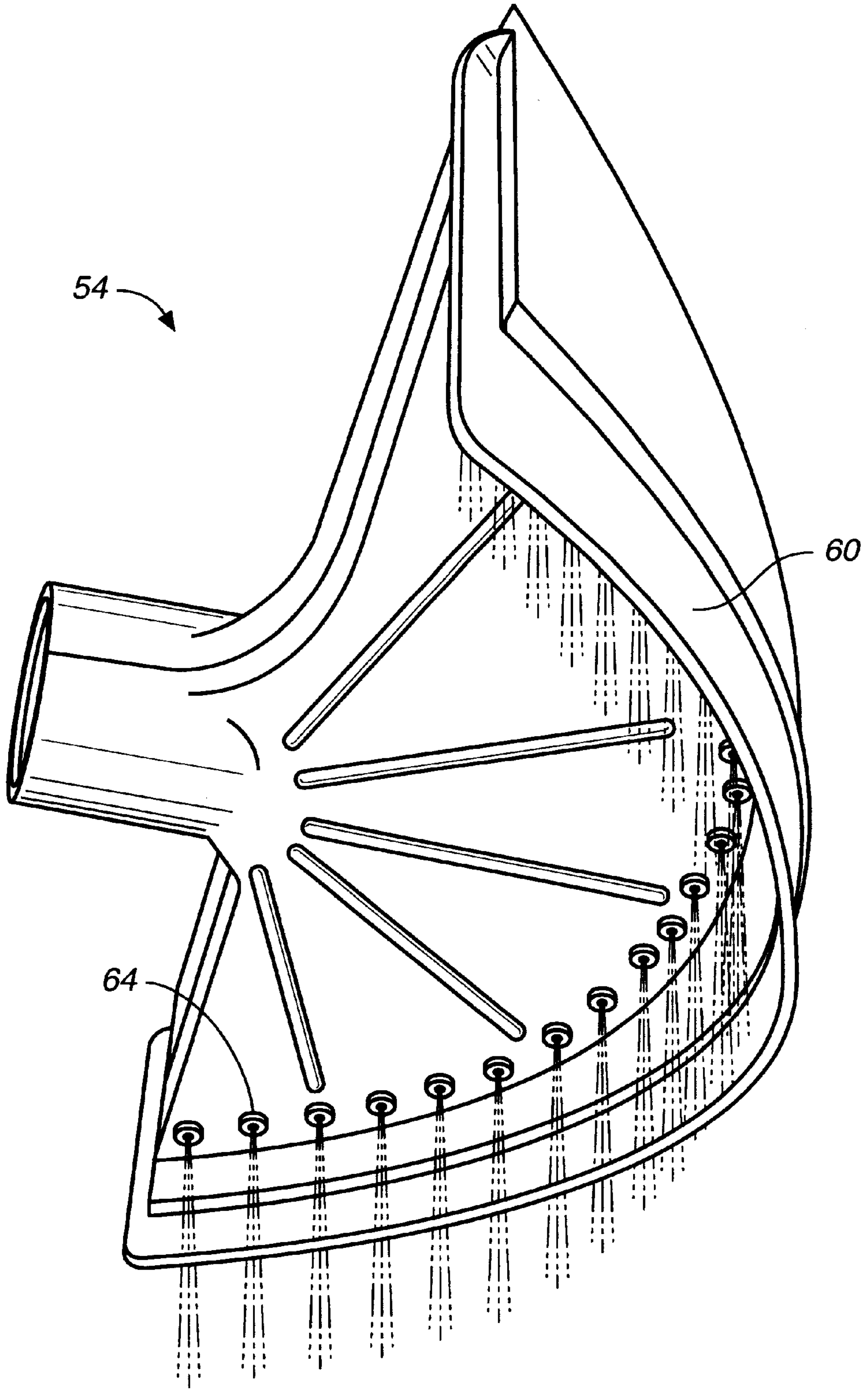
FIG. 8 is a bottom perspective view of the manifold assembly of the multiple-nozzle embodiment of FIG. 6 in its active (washing) mode, illustrating the water spray from the plurality of nozzles.

FIG. 8 is a bottom perspective view of the manifold assembly 54 of the embodiment of FIG. 6 in its active (washing) mode, illustrating the water spray for the multiple nozzles 64. Preferred placement and orientation of these nozzles adjacent the blade 60 serves to deliver more water to the lateral ends of the squeegee, directs water away from the blade, and keeps more water on the animal and less on the operator.

Manifold embodiment 40 is preferably constructed by injection molding techniques to reduce cost. Alternatively, a manifold embodiment could be constructed with water delivered to an arcuate tube with a plurality of holes (nozzles), and appropriate tube fittings for connection to a water supply and termination of the tube ends.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and their legal equivalents.

What is claimed as invention is:

1. A squeegee apparatus for the washing and grooming of animals, said squeegee apparatus comprising:

a body portion adapted for connection to a supply of water;

a valve in said body portion to regulate the flow of water;

a nozzle on said body portion oriented to direct a spray of water away from said body portion; and an arcuate wiping blade adjacent said nozzle, said arcuate wiping blade having an apex and a pair of ends, and said nozzle is positioned aft of said apex and forward of said pair of ends of said blade, wherein when said squeegee apparatus is connected to a supply of water and is drawn across an animal's coat, water from said nozzle wets the animal's coat, and said arcuate wiping blade removes the water.

2. The squeegee apparatus of claim 1 wherein said nozzle on said body portion is oriented to direct a spray of water generally perpendicularly downward relative to said body portion.

3. The squeegee apparatus of claim 1 including a pair of struts extending laterally outward from said body portion, connected to a wiping blade and blade supports.

4. The squeegee apparatus of claim 3 including a proximal blade support and a distal blade support comprising rigid, curved plate members, capturing a flexible wiping blade therebetween.

5. The squeegee apparatus of claim 1 wherein said valve is conditioned to permit water flow through said nozzle when said valve is depressed.

6. The squeegee apparatus of claim 1 including a manifold having a plurality of nozzles.

7. The squeegee apparatus of claim 6 wherein said plurality of nozzles are disposed in an arcuate array adjacent said wiping blade.

8. The squeegee apparatus of claim 6 wherein said manifold comprises upper and lower manifold halves.

9. The squeegee apparatus of claim 8 wherein said upper and lower manifold halves capture a flexible squeegee blade therebetween.

10. A squeegee apparatus for the washing and grooming of animals, said squeegee apparatus comprising:

a body portion adapted for connection to a supply of water;

a valve in said body portion to regulate the flow of water;

a manifold having a plurality of nozzles on said body portion oriented to direct a spray of water away from said body portion, said manifold comprising upper and lower manifold halves; and an arcuate wiping blade adjacent said nozzle, wherein when said squeegee apparatus is connected to a supply of water and is drawn across an animal's coat, water from said nozzle wets the animal's coat, and said arcuate wiping blade removes the water.

11. The squeegee apparatus of claim 10 wherein said upper and lower manifold halves capture a flexible squeegee blade therebetween.

* * * * *